US011392471B2

(12) United States Patent
Ferreira et al.

(10) Patent No.: US 11,392,471 B2
(45) Date of Patent: Jul. 19, 2022

(54) DIAGNOSTIC TEST

(71) Applicant: Lenovo (Singapore) Pte. Ltd., Singapore (SG)

(72) Inventors: Marcelo Ferreira, Campinas (BZ); Gustavo Labbate Godoy, Sumare (BZ)

(73) Assignee: Lenovo (Singapore) Pte. Ltd., Singapore (SG)

( * ) Notice: Subject to any disclaimer, the term of this patent is extended or adjusted under 35 U.S.C. 154(b) by 155 days.

(21) Appl. No.: 16/572,232

(22) Filed: Sep. 16, 2019

(65) Prior Publication Data

US 2021/0081290 A1 Mar. 18, 2021

(51) Int. Cl.
*G06F 11/00* (2006.01)
*G06F 11/26* (2006.01)
*G06F 13/42* (2006.01)

(52) U.S. Cl.
CPC .......... *G06F 11/26* (2013.01); *G06F 13/4282* (2013.01); *G06F 2213/0042* (2013.01)

(58) Field of Classification Search
CPC .... G06F 11/26; G06F 11/321; G06F 11/3692; G06F 11/2205
See application file for complete search history.

(56) References Cited

U.S. PATENT DOCUMENTS

2019/0121647 A1* 4/2019 Por ..................... G06F 11/2284
2019/0371091 A1* 12/2019 Frisch ................. G07C 5/0808
2020/0081811 A1* 3/2020 Matsuda ............. G06F 13/4282

OTHER PUBLICATIONS

LG, Smart Diagnosis, Aug. 26, 2017, https://images.homedepot-static.com/catalog/pdfImages/29/29261767-8fc1-46c3-901d-2d37004425c5.pdf, 5 pages (Year: 2017).*

* cited by examiner

*Primary Examiner* — Katherine Lin
(74) *Attorney, Agent, or Firm* — Ference & Associates LLC

(57) ABSTRACT

One embodiment provides a method, including: detecting, on an information handling device, a connection to another device; accessing, on the information handling device, a diagnostic application; executing, using the diagnostic application and through the connection, a diagnostic test of the another device; and outputting result data associated with the diagnostic test. Other aspects are described and claimed.

12 Claims, 3 Drawing Sheets

DIAGNOSTIC TEST

BACKGROUND

Users frequently utilize their information handling devices ("devices"), for example laptop and/or personal computers, other like devices, etc., to perform a variety of daily tasks. Issues may occasionally arise with these devices that affect their ability to function properly. For example, a hardware component may fail, a piece of software may require an update, another issue may be present, etc. The issue with the device must first be identified (e.g., by a user, by another individual, etc.) before a solution can be implemented.

BRIEF SUMMARY

In summary, one aspect provides a method, comprising: detecting, on an information handling device, a connection to another device; accessing, on the information handling device, a diagnostic application; executing, using the diagnostic application and through the connection, a diagnostic test of the another device; and outputting result data associated with the diagnostic test.

Another aspect provides an information handling device, comprising: a processor; a memory device that stores instructions executable by the processor to: detect a connection to another device; access, on the information handling device, a diagnostic application; execute, using the diagnostic application and through the connection, a diagnostic test of the another device; and output result data associated with the diagnostic test.

A further aspect provides a product, comprising: a storage device that stores code, the code being executable by a processor and comprising: code that detect a connection to another device; code that access a diagnostic application; code that executes a diagnostic test of the another device; and code that outputs result data associated with the diagnostic test.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
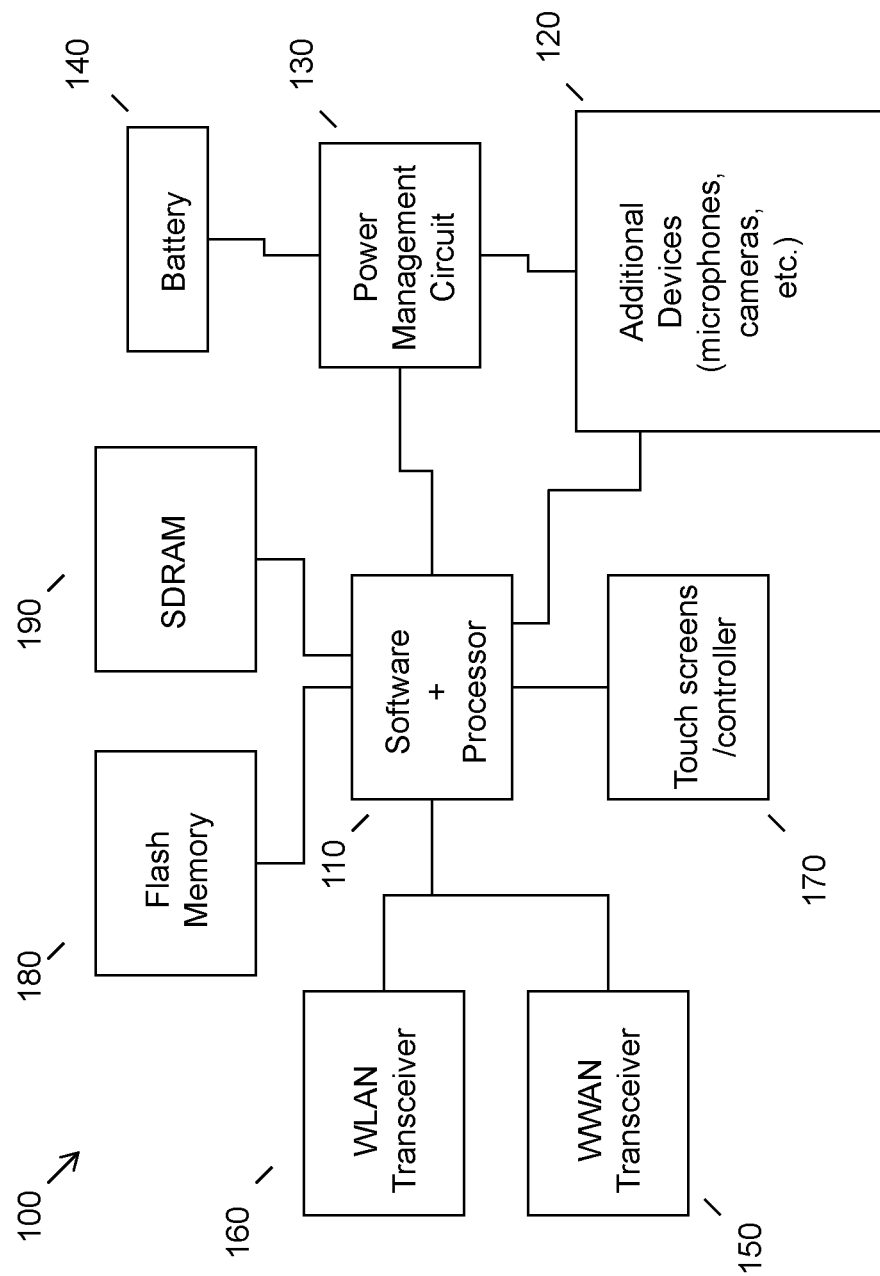
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users who encounter activation or functionality issues with their computer device often do not have an easy way to diagnose the issue. More particularly, most users rely on the assistance of a customer support operator because they do not have the requisite technical skill necessary to identify and/or to fix the issue by themselves. Consequently, a common occurrence is that users will call into a customer support center for assistance. On this call, a user will generally do their best to describe the issue and the operator will attempt to identify the problem based upon the user's description.

When the issue cannot be readily identified, a frequently suggested solution by the operator is to create a bootable USB drive. The bootable USB drive may be used to recover, repair and install an operating system and provides users with an alternative method to boot a system. The bootable USB drive may be set up using a native operating system component or through various third-party utilities. The software/utility will copy all of the operating system files and boot sequence into the USB drive to enable the USB boot. Although an effective repair method, most users do not have the know-how or resources (i.e., another computing device) to perform this task. Additionally, the customer support process may be frustratingly long and burdensome, thereby detracting from the user experience.

Accordingly, an embodiment provides a user-friendly method for diagnosing issues with their computing device by using a mobile device. In an embodiment, a user may use their mobile device (e.g., mobile phone, tablet, etc.) to establish a connection (e.g., a USB connection, etc.) with their computing device. An embodiment may then access a diagnostic application on their mobile device that performs a diagnostic test, through the established connection, on the computing device. Once the test is completed, an embodiment may output result data of the test to the user on their mobile device. This result data may contain one or more report codes that may specify the issues detected with the computing device. The user may thereafter attempt to remedy the identified issue themselves or may open a help ticket with a customer support center (e.g., through the diagnostic application, etc.) and provide them the results of the test, which the customer support operator can use to more easily assist the user. Such a method may allow users to diagnose issues with their computing devices in a simpler and more convenient way than conventional processes.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
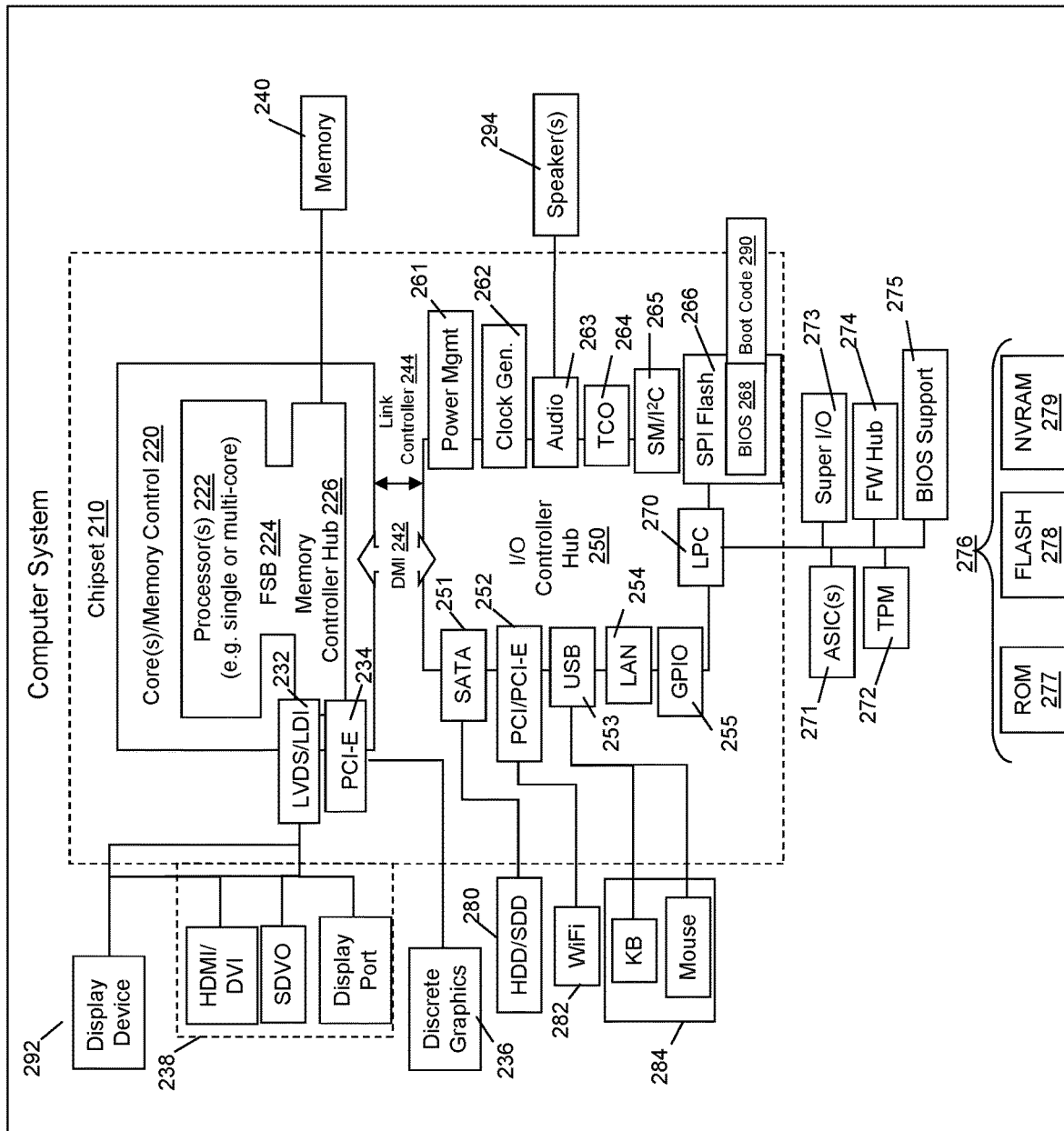
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of connecting to a computing device and running a diagnostic test on the computing device. For example, the circuitry outlined in FIG. 1 may be implemented in a smart phone or tablet embodiment, whereas the circuitry outlined in FIG. 2 may be implemented in a laptop.

Figure 3:
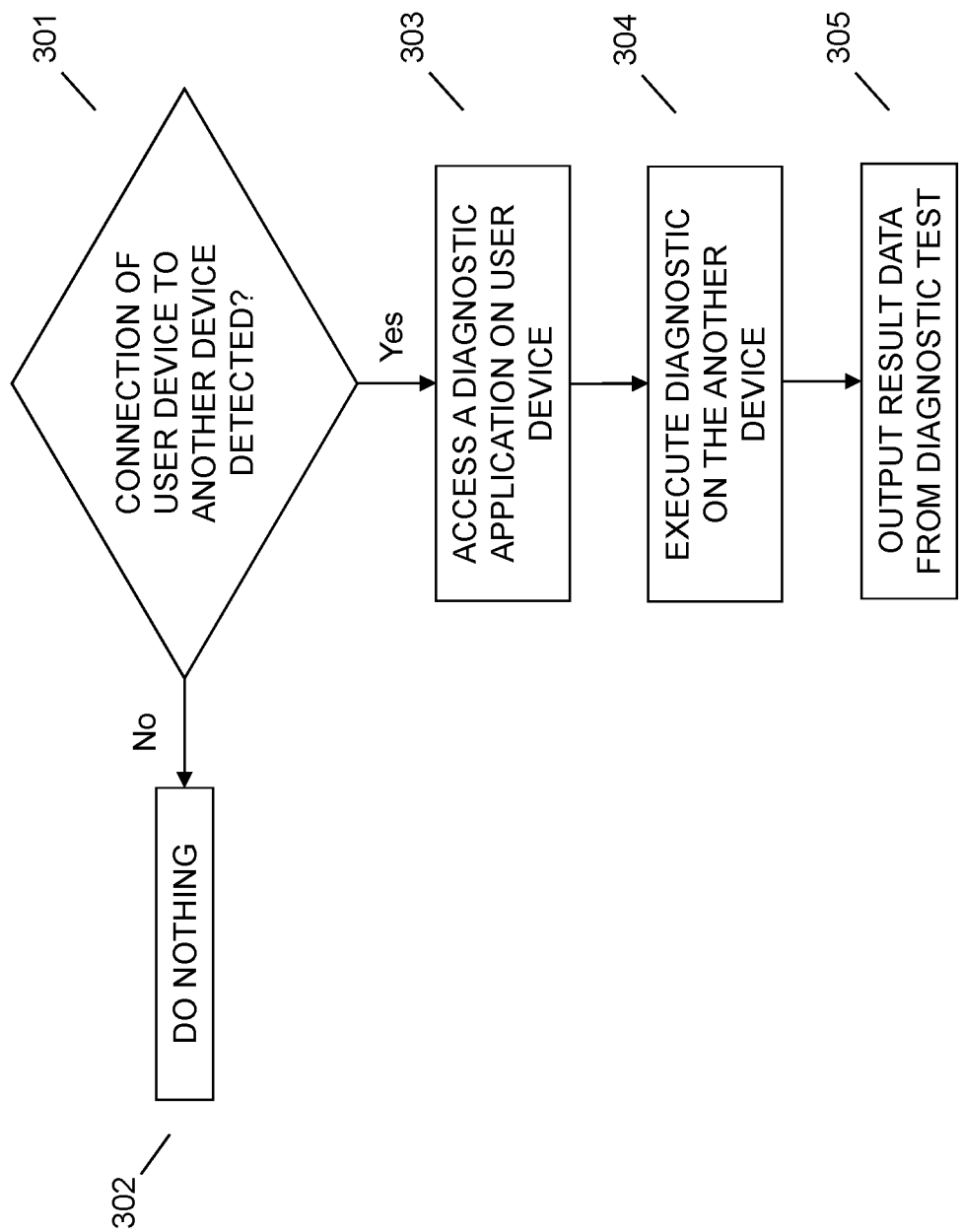
FIG. 3 illustrates an example method of running a diagnostic test on a device.

Referring now to FIG. 3, an embodiment may perform a diagnostic test on a connected computing device using another device. At 301, an embodiment may detect a connection of a computing device to a user's device. In an embodiment, the computing device may be a laptop computer, a desktop computer, another type of computing device, etc. The user's device may be virtually any type of device such as a mobile phone, a tablet, a smart watch, another computing device, etc. For simplicity purposes, the remaining discussion will be described with reference to a mobile phone as the user' device. However, it is important to note that this designation is not limiting and that other mobile devices, as described above, may also be utilized.

In an embodiment, the connection between the two devices may be virtually any wired or wireless connection that allows the processes of an application installed on one device to perform actions on the other device. For simplicity purposes, the connection described herein may refer to a USB connection established by using a USB cable. More particularly, the USB cable may run from a port of the mobile phone to a receiving port of the computing device.

Responsive to detecting, at 301, that a connection between the mobile phone and the computing device has not been established, an embodiment may, at 302, take no additional action. Conversely, responsive to detecting, at 301, that a connection between the mobile phone and the computing device has been established, an embodiment may, at 303, access a diagnostic application.

The diagnostic application may be resident on the mobile device. A user may download the diagnostic application (e.g., from the cloud, another device or storage space, etc.) to the mobile device using a Wi-Fi or a mobile data connection. The diagnostic application may contain the programmed capability to run a scan of a desired computing device's system to identify any issues associated with it (e.g., failing hardware components, out-of-date software, other issues, etc.). Once downloaded to the mobile phone, an internet connection is no longer needed for the diagnostic application to function properly. Additionally, the diagnostic application only needs to be downloaded to the mobile phone and need not be also downloaded to the computing device.

At 303, an embodiment may utilize the capabilities of the diagnostic application to execute a diagnostic test on the computing device. In an embodiment, the diagnostic test may be executed on the computing device responsive to detecting that the diagnostic application is active and that a connection between the two devices is established. Stated differently, explicit user input is not required to begin execution of the diagnostic test. Alternatively, the diagnostic test may be executed responsive to receiving test initiation input from a user (e.g., provided to the diagnostic application, etc.).

At 304, an embodiment may output the result data of the diagnostic test. More particularly, some or all of the data obtained from the diagnostic test may be reported back to and/or saved in the diagnostic application. In an embodiment, the result data may comprise one or more indications of issues related to the computing device. For example, the result data may comprise textual summaries of each identified issue. Additionally or alternatively, the result data may return one or more report codes, wherein each of the report codes corresponds to a specific issue associated with the computing device. For example, one report code may refer to a failed hardware component whereas another report code may indicate that a user needs to download a particular driver.

At this point, the user may utilize the information they received from the diagnostic test to attempt to solve the problem themselves. For example, the user can look up the issue associated with the report code (e.g., using their mobile phone, etc.) and thereafter implement the corresponding solution. Alternatively, the user may contact a customer support operator to seek additional assistance with their issue. Options may be available in the diagnostic application to establish a line of communication with a support operator (e.g., through a wired or wireless internet connection, etc.). For example, a user may use the diagnostic application to open a help ticket that may connect the user to the support operator (e.g., through an online chat, voice call, etc.). Any result data, including any report codes or issue descriptions, may be transmitted to and/or made available to the support operator when the help ticket is created. In such a situation, a user does not need to struggle to explain the issue because the support operator has all of the diagnostic information they need in front of them, thereby expediting the solution process.

The various embodiments described herein thus represent a technical improvement to conventional methods for running a diagnostic test on a computing device. Using the techniques described herein, an embodiment may first detect a connection between a mobile device (e.g., a user's smart phone, etc.) and a user's computing device (e.g., laptop or desktop computer, etc.). An embodiment may then access a diagnostic application that is resident on the user's mobile device and utilize that diagnostic application to execute a diagnostic test of the computing device. The results of that test may thereafter be output to a user and/or transmitted to a customer support operator who may use that information to more easily and quickly assist a user. Such a technique allows for the quick and hassle-free identification of issues and corresponding solutions for a user's computing device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, on an information handling device, a connection to another device;
    accessing, on the information handling device, a diagnostic application;
    executing, using the diagnostic application and through the connection, a diagnostic test of the another device, wherein the diagnostic test is conducted without internet connection;
    outputting result data associated with the diagnostic test, wherein the result data comprises an indication of at least one issue associated with the another device and a textual summary of each identified issue, and wherein each of the at least one issues is associated with a report code with a corresponding solution;
    receiving a request from a user of the information handling device to establish a connection with a support operator; and
    dynamically transmitting, subsequent to establishing the connection, the report code, the result data, and the corresponding solution to the support operator.

2. The method of claim 1, wherein the connection is established using a USB cable.

3. The method of claim 1, wherein the information handling device is a mobile device and wherein the another device is a computer device.

4. The method of claim 1, wherein the transmitting comprises transmitting the result data to a help source using at least one of: a mobile connection and a wireless connection.

5. The method of claim 1, wherein the executing comprises automatically executing the diagnostic test responsive to identifying that the connection is detected and that the diagnostic application is active.

6. The method of claim 1, wherein the diagnostic application is downloaded to the information handling device from a cloud source.

7. An information handling device, comprising:
    a processor;
    a memory device that stores instructions executable by the processor to:
    detect a connection to another device;
    access, on the information handling device, a diagnostic application;
    execute, using the diagnostic application and through the connection, a diagnostic test of the another device, wherein the diagnostic test is conducted without internet connection;
    output result data associated with the diagnostic test, wherein the result data comprises an indication of at least one issue associated with the another device and a textual summary of each identified issue, and wherein each of the at least one issues is associated with a report code with a corresponding solution;
    receive a request from a user of the information handling device to establish a connection with a support operator; and
    dynamically transmit, subsequent to establishing the connection, the report code, the result data, and the corresponding solution to the support operator.

8. The information handling device of claim 7, wherein the connection is established using a USB cable.

9. The information handling device of claim 7, wherein the information handling device is a mobile device and wherein the another device is a computer device.

10. The information handling device of claim 7, wherein the instructions executable by the processor to transmit comprise instructions executable by the processor to transmit the result data to a help source using at least one of: a mobile connection and a wireless connection.

11. The information handling device of claim 7, wherein the instructions executable by the processor to execute comprise instructions executable by the processor to automatically execute the diagnostic test responsive to identifying that the connection is detected and that the diagnostic application is active.

12. A product, comprising:
    a storage device that stores code, the code being executable by a processor and comprising:
    code that detect a connection to another device;
    code that access a diagnostic application;
    code that executes a diagnostic test of the another device, wherein the diagnostic test is conducted without internet connection;
    code that outputs result data associated with the diagnostic test, wherein the result data comprises an indication of at least one issue associated with the another device and a textual summary of each identified issue, and wherein each of the at least one issues is associated with a report code with a corresponding solution;
    code that receives a request from a user of the information handling device to establish a connection with a support operator; and
    code that dynamically transmits, subsequent to establishing the connection, the report code, the result data, and the corresponding solution to the support operator.

* * * * *